Feb. 12, 1952  H. E. REITER  2,585,405
DISK-TYPE LAWN MOWER
Filed Nov. 18, 1948
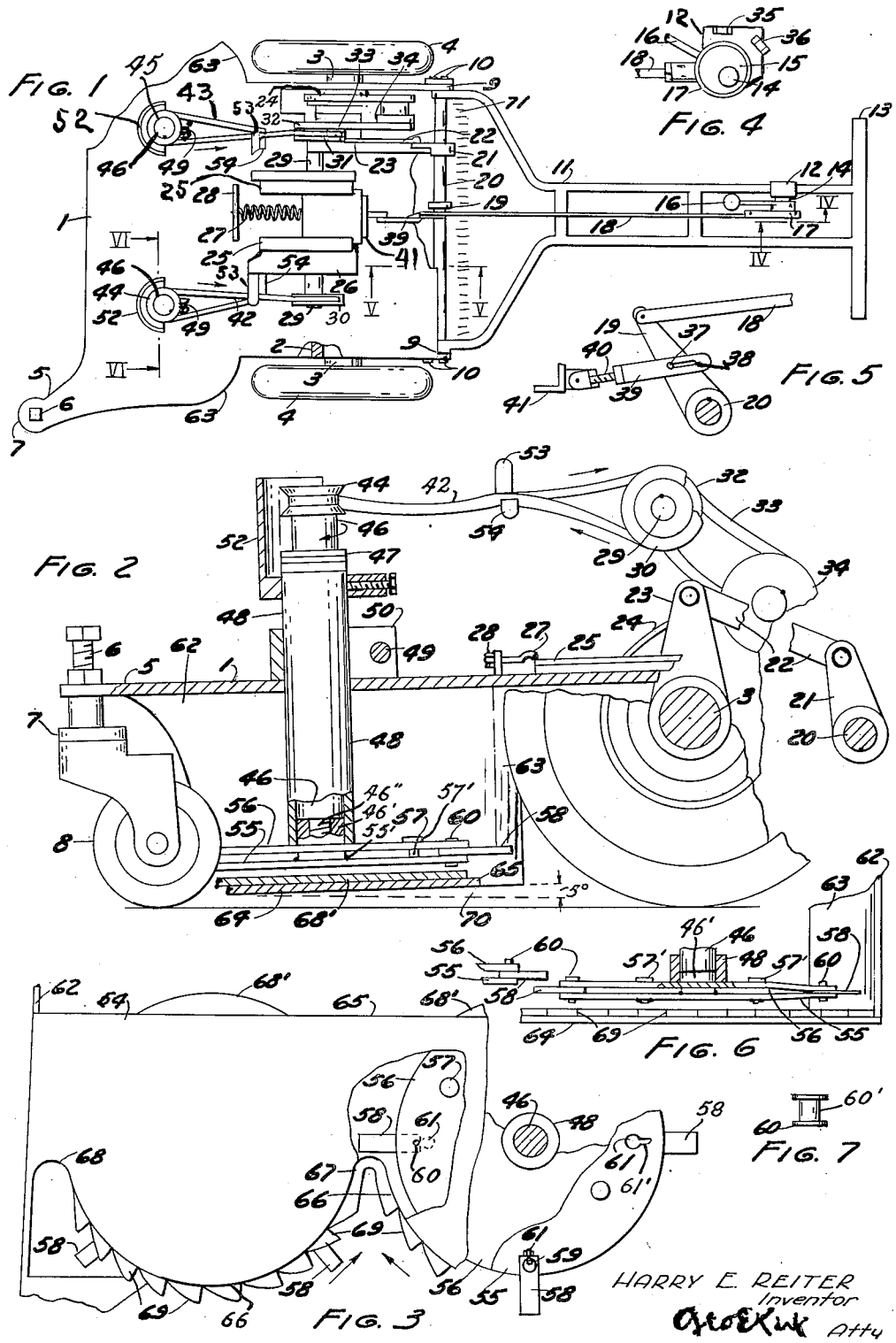
HARRY E. REITER
Inventor

Patented Feb. 12, 1952

2,585,405

UNITED STATES PATENT OFFICE 2,585,405

DISK-TYPE LAWN MOWER

Harry E. Reiter, Bowling Green, Ohio

Application November 18, 1948, Serial No. 60,714

2 Claims. (Cl. 56—25.4)

This invention relates to plural rotary disk cutters of the power operated type, for trimming vegetation.

This invention has utility when incorporated in a lawn mower, mounting an internal combustion engine providing power selectively controllable for propulsion. Trailing the mower is a rigidly connected handle, whereby the operator may direct the course the power mower machine is to take, but may from such handle control the gas engine drive for the ground wheels as well as set the connections for the high speed rotation of the shielded cutting disks to effect the lawn cutting operations.

Referring to the drawings:

Fig. 1 is a plan view, with portions broken away, of an embodiment of the invention in a power type of lawn mower;

Fig. 2 is an enlarged fragmentary central vertical section, more especially of the transmission connection features for the drive or propulsion, as well as the cutting disks;

Fig. 3 is a bottom plan view of the ground-clearance shield and the cutting disks relation thereto, portions being broken away;

Fig. 4 is an enlarged view from the line IV—IV, Fig. 1, showing features of the power control, independent of the handle;

Fig. 5 is an enlarged view from the line V—V, Fig. 1, showing features of the pull-up from the power control, to bring to taut the belts from the gas engine to drive the cutting disks, the slack or idle position therefor being shown in Fig. 2, in which Fig. 2 the belt is slack for the propulsion also not being effective;

Fig. 6 is an enlarged view on the line VI—VI, Fig. 1; and

Fig. 7 is an enlarged side elevation of a freely-swinging blade mounting pin or pivot.

A sheet metal deck 1 has bearings 2 for a shaft 3 having ground wheels 4 at its opposite ends. The wheels 4 are fixed with the shaft 3 as an axle, under the deck 1. The deck has spread arms or forward corner extensions 5 for screw stems 6, rotatable relatively to the arms 5, in effecting vertical adjustment relatively to the deck 1 of swivel bearings 7 mounting caster ground wheels 8, adapted freely to trail as the deck 1 is propelled or pushed forward.

At the rear corners projecting ears 9 have bolt pairs 10 therein to fix an upward trailing angle from the deck in the range of 45° for a mower-directing handle 11 having a control mounting 12 (Figs. 1, 4) assembled in relation thereto at the openwork region of the handle 11 (Fig. 1) in proximity to and adjacent hand grips 13. The control mounting 12 has fixed therewith a horizontally extending boss (Fig 4), short cylindrical portion or stub shaft 14 providing a bearing for an eccentric 15 having an actuator arm 16 extending radially therefrom. A ring 17 on the eccentric 15 has a rod 18 extending therefrom to an arm 19 (Fig. 5) fixed with a rock shaft 20 mounted in the deck rear ears 9.

Also fixed with the rock shaft 20 is an arm 21 (Fig. 2) having a link 22 therefrom to an arm 23 fixed with a speed reduction housing 24 loosely mounted on the axle 3.

Forwardly of the arm 19, the deck 1 has a pair of slide way providing overhanging flanges 25 (Figs. 1, 2) providing a way for an internal combustion engine 26. The engine 26 has a tension spring 27 connected thereto and extending forward to an anchor device 28 weld attached to and rising from the medial portion of the deck 1 (Figs. 1, 2). Accordingly, the motor or engine 26 is normally urged away from the region of the shaft 20. The engine 26 has parallel to the axle 3 and the shaft 20, a drive shaft 29 protruding from the opposite sides of the motor, which shaft 29 has on one end thereof a pulley 30 and on its other end pulleys 31, 32, fixed therewith.

From the pulley 32 a belt 33 extends about a pulley 34 in transmission sequence to the speed reduction housing 24 of the wheel driving mechanism. Accordingly as the eccentric arm 16 is pulled to a spring stop 35 (Fig. 4) at the mounting 12, the rod 18, thru the arm 19, rocks the shaft 20, the arm 21, and thru the link 22 shifts the housing 24 about the axle 3, to taut the belt 33 and thereby positively drive the ground wheels 4, say at a propulsion rate in the range of 2½ to 3 miles per hour.

Upon the arm 16 being pulled from the spring catch or stop 35 to a spring catch or stop 36 (Fig. 4), there is effected a still further rocking of the shaft 20. The arm 19 (Fig. 5) has a pin 37, which in this first movement of the arm 16, merely slid along in a slot 38 of a link 39 having relatively rotatable threaded means providing adjustable connection 40 to a base plate 41 for the motor 26. This pull operation by the arm 16, causes the motor 26 to be shifted rearwardly in the slide guides 25, to bring to taut condition belts 42, 43, about the pulleys 30, 31, fixed with the engine drive shaft 29. Looking down on Fig. 1, the belt 42, drives a pulley 44 clockwise, and the belt 43, drives a pulley 45, counterclockwise.

Each pulley 44, 45, is mounted fixed with a vertical shaft 46, sustained by a bearing 47 on a vertically adjustable sleeve 48. Bolts 49 are in a split clamp 50. With the bolts 49 loosened, the clamp 50 is sufficiently released for relative movement as to the structure embraced thereby. However, upon tightening of the bolts 49, the clamp 50 is thereby brought into position to hold the sleeves 48 against up or down movement relatively to the deck 1, while these sleeves provide rigid lateral guides for the respective shafts 46. Set screws 51 engage the respective sleeves 48 for mounting upwardly extending belt shields and retaining guides 52 in the region of the pulleys 44, 45. The motor 26, has therefrom a belt direction guide 53 (Figs. 1, 2) for the crossed V-belts 42, 43, and lower guides 54 for these belts 42, 43. It is pointed out that by having these guides 53, 54, mounted on the shiftable motor housing with the motor, their proximity to the drive pulleys 30, 31, is a constant.

It is to be noted that the pull thru the link 22 in the propulsion transmission for the lawn mower, is not sufficient to overcome the spring 27. Accordingly, at the additional rocking of the shaft 20, with the motor 26 now shifted, there is simultaneously therewith a like further rocking of the speed reduction housing 24, thereby coacting to maintain the propulsion connection effective at this period now when the drive transmission is to operate the cutting disks for the mower.

The rotary cutting means comprises a pair of sheet metal disks 55, 56, say of about 18 to 20 gauge stock, having a boss 46' projecting above one side of the pair. The boss 46' may be welded at 55' to the disk 55. The upper end of the boss 46' may be threaded internally in the direction of the rotation of the shaft 46 to cooperate with an externally threaded portion 46" on the end of the shaft 46, whereby the boss 46' forms a flush extension to the end of the shaft 46. In addition to the fixed anchoring of these disks at the lower ends of the shafts 46, the disks have rivets 57 providing a slight central spacing between the disks, which rivets are flush at the bottom or lower face of the disk 55, but project upward to have head portions 57' above the disk 56 in an annular series somewhat inward from the common edges of the two disks.

A plurality, say in 90° spaced relation, of cutters 58 are provided. Each of these cutters or freely swinging centrifugally thrown blades has near its inner end an opening 59 (Fig. 3) somewhat larger in diameter to the reduced diameter of double headed pivot pins 60 (Figs 6, 7). Desirably, the normal spacing between the disks 55, 56, in the regions of the peripheries thereof, is somewhat in excess to the thickness of the blades 58. For assembly, the respective blades are inserted as to the openings 59, between the disks 55, 56, to approximate register with the inward larger diameter radial key-hole shaped disk openings 61. The openings 61 are in annular series inward from the periphery of the disks 55, 56, and with the narrowed portions 61' of such openings extending radially outward from the circular inner end portions of such openings. The larger diameter head of a pivot pin 60 may be inserted thru the registering openings of the key-hole ports 61 and the blade 58 opening 59, for the reduced diameter mid portion 60' of the pivot pin to extend from the lower outer face of the lower disk 55 to the upper outer face of the upper disk 56, with the blade 58 therebetween at its opening 59. Centrifugal force, or radial outward pulling of the blade 58, moves the pivot pin 60 to the outer narrower portion of the key-hole 61 and simultaneously draws slightly toward each other the opposing or inner faces of the disks 55, 56. There is thus effected automatically a slight frictional gripping of the pivot pins. However this inward pulling of the rims of the disks in the vicinity of the cutters 58 is not sufficient to bind or grip the cutters 58, but leaves such free to swing radially into active cutting position.

The deck 1 at its opposite sides has downwardly extending throw-fending side portions 62 extending aft to inwardly arced portions 63 to prevent cutting from being thrown into the wheels 4. In parallel spaced relation as to the deck 1, the side portions 62 have a lower edge connecting or shield bottom plate 64 of rigidity. This bottom shield 64 may have generally straight back edge 65 and a pair of forward arced portions 66 which may approximate slightly beyond flush with the outer edges of the disks 55, 56. There is thus formed a mid re-entrant portion 67 and marginal portions 68 adjacent the portions 62. Supplementally, there is fixed with the upper side of the shield 64 a heavy inner plate 68' having fixed teeth 69 approximating uniform tip spacing in the direction of the mower forward travel and serving as a sort of comb forward of the shield 64.

*Mower adjustments relatively to ground travel*

By adjusting the stems 6, the spacing of the shield 64 to ride clear of the ground, may be varied. In practice, it is desirable as to the wheel height determined by the wheels 4, to have a slight aft rise 70, of say as much as 5° for the under face or side of the shield 64. The experience in practice is, that this general tilt given to the machine and the cutters, coacts more readily for throwing the cut particles clear of the unit. The adjustment 49, 50, for the shaft 46, and with it the cutters 58, desirably is to have as much as ⅛" clearance between the under side of the lower disk 55 and the upper side of the tooth or comb plate 68'. With this adjustment, say for the shaft 46 having the pulley 44, the adjustment for the other shaft 46 having the pulley 45, is somewhat higher; as much as ⅛" more so that the blades 58 of this latter cutter may operate in a different plane than the blades of the former cutter (Fig. 6). The spacing between the cutters is taken for path overlap in the region of the mid portion 67, in their travel toward each other as angularly out of step.

For the lawn cutting, adjustments may be made, say from ½" up to 2" with a 10" diameter ground wheel 4.

For the disks 55, 56, in the range of 8" diameter, efficient cutting speeds are as high as 800 R. P. M. The clearway between the sides 62 below the deck 1 and over the disks 56 does not produce any objectionable fannings, nor suction at the front which might tend to raise dust or throw fine particles into the air. By leaving the rivets 57 to provide heads at the top of the disks 56, there is established some slight throwing action. This in practice has been found effective in the general openway thru under the unit, not to throw a windrow, but to leave a uniformly distributed region of cuttings 71 of the cuttings to follow the mower. The advantage of this in practice, is that the grass as fines may be left on the lawn as a mulch in promoting growth and moisture holding for the soil to retain freshness of being green. In such event as there may be purpose to gather the cuttings, it is then up to the operator to elect the upward inclination in the throwing of the cuttings 71 to deliver such at least 2" to 3" off the ground. Accordingly, with no receiver, there is no throwing of the cuttings 71 to impinge upon the apparel or above lower footwear of the one directing the machine of the disclosure herein. The deck layout is such that the blades 58 as radially flying out from between the high speed rotating disks 55, 56, effectively shears a width area, even in advance of the ground wheels 4. This means that there is not a laying-down of unmowed strips therefrom. The relatively small and narrow caster rollers 8 do not materially laydown grass at first passing over, and coact for close-up approaches to trees and lawn edge regions. The suggestive hammermill throwing of the blades 58 is sufficiently positive to cut hollyhocks and/sunflower stems and woody stock of ½" and more, and automatically retracts or is swung back as a stone or other resistance be struck. As dulled, the blade (illustrated as bilaterally symmetrical) is readily reversed or replaced and as lost does not disturbingly unbalance the disks.

What is claimed and it is desired to secure by Letters Patent is:

1. A mower deck, a pair of vertically independently adjustable shafts thru the deck, driving means for rotating the shafts toward each other, two pair of spaced disks having peripheral yieldable portions, each pair of disks forming a unit, one of said units being fixed with each shaft with radial spacing between the units, there being a plurality of radially extending openings in proximity to the unit periphery, blades having pivot bearing openings and insertable between the disk of a unit for registering with said unit openings, and assembly pins in the openings in which assembly a pin is radially shiftable in two registering openings of a unit to flex the disk unit yieldable periphery portions toward the blade in frictionally holding the pin with the blade pivoted for freely swinging radially outward from the periphery of the unit upon driving means rotation of the shafts.

2. A power mower comprising a deck, a power source mounted on the deck, rotary cutter means carried by said deck, a directing handle connected to said deck, power driven ground wheels supporting the deck, an operative connection between the power source and the ground wheels, an additional operative connection between the rotary cutter means and the power means, and an actuator device mounted on the handle and shiftable in one direction from an initial inactive first position through second and third selective positions for successively rendering said connections effective, said device having a lever to operate one of said connections when shifted into said second position, and said device having a link connected with said lever coacting in response to the device shifting to said third position to render both said connections effective to operate the cutting means in addition to the driving of the ground wheels.

HARRY E. REITER.

REFERENCES CITED

The following references are of record in the file of this patent:

UNITED STATES PATENTS

| Number | Name | Date |
|---|---|---|
| 1,868,918 | Schenk | July 26, 1932 |
| 1,902,524 | Roth | Mar. 21, 1933 |
| 1,940,216 | Jacobson | Dec. 19, 1933 |
| 2,188,110 | Fahnestock | Jan. 23, 1940 |
| 2,243,133 | Steiner et al. | May 27, 1941 |
| 2,308,076 | Hainke | Jan. 12, 1943 |
| 2,477,442 | Cramer et al. | July 26, 1949 |
| 2,485,729 | Gentry | Oct. 25, 1949 |

FOREIGN PATENTS

| Number | Country | Date |
|---|---|---|
| 107,917 | Australia | July 20, 1939 |